US006944426B1

(12) United States Patent
Esser et al.

(10) Patent No.: US 6,944,426 B1
(45) Date of Patent: Sep. 13, 2005

(54) METHOD AND A MOBILE STATION FOR CONFIGURING A BASE STATION

(75) Inventors: Alex Esser, Espoo (FI); Philip Wesby, Espoo (FI); Teppo Tossavainen, Espoo (FI); Hasse Sinivaara, Espoo (FI); Heikki Hirvonen, Viiala (FI); Jukka Suonvieri, Tampere (FI); Matti Juuti, Tuusula (FI)

(73) Assignee: Nokia Networks Oy, Nokia Group (FI)

( * ) Notice: Subject to any disclaimer, the term of this patent is extended or adjusted under 35 U.S.C. 154(b) by 0 days.

(21) Appl. No.: 09/719,413

(22) PCT Filed: Jun. 29, 1999

(86) PCT No.: PCT/FI99/00572

§ 371 (c)(1),
(2), (4) Date: Feb. 23, 2001

(87) PCT Pub. No.: WO00/01177

PCT Pub. Date: Jan. 6, 2000

(30) Foreign Application Priority Data

Jun. 29, 1998 (FI) .................................... 981491

(51) Int. Cl.[7] .................. H04B 15/00; H04B 17/00; H04Q 7/20

(52) U.S. Cl. .................. 455/62; 455/561; 455/464; 455/450; 455/422.1; 455/434

(58) Field of Search .................. 455/62, 561, 524, 455/509, 464, 450, 422, 434, 515

(56) References Cited

U.S. PATENT DOCUMENTS

| 5,212,831 | A |   | 5/1993  | Chuang et al. |
| 5,732,327 | A |   | 3/1998  | Yoshimi et al. |
| 6,009,332 | A | * | 12/1999 | Haartsen ............ 455/450 |
| 6,496,700 | B1 |  | 12/2002 | Chawla et al. |

FOREIGN PATENT DOCUMENTS

| EP | 0 497 490 A2 | 1/1992 |
| EP | 0 549 811 A1 | 7/1992 |
| JP | 08-237728    | 9/1996 |
| JP | 10-42338     | 2/1998 |

OTHER PUBLICATIONS

Translation of Office Action in corresponding Japanese patent application (No. 200-557646).

* cited by examiner

*Primary Examiner*—Vivian Chin
*Assistant Examiner*—Eugene Yun
(74) *Attorney, Agent, or Firm*—Cohen, Pontani, Lieberman & Pavane

(57) ABSTRACT

The invention relates to a method and an arrangement for configuring an indoor base station for a cellular mobile telecommunications network. According to an advantageous embodiment of the inventive method, a mobile communications means is used to scan possible transmission frequencies on-site to find out free frequencies to operate on, and to transmit the results of scanning of the frequencies to the indoor base station and to choose proper parameters for the indoor base station. An arrangement according to an advantageous embodiment of the invention comprises an indoor Base Transceiver Station, mobile communications means for scanning frequencies and to find free frequencies and a Base Station Controller for controlling the base station.

16 Claims, 3 Drawing Sheets

METHOD AND A MOBILE STATION FOR CONFIGURING A BASE STATION

CROSS REFERENCES TO RELATED APPLICATIONS

This is a national stage application under 35 U.S.C. §371 of international stage PCT application No. PCT/FI99/00572, filed on Jun. 29, 1999. Priority is claimed under 35 U.S.C. §119(a) and 35 U.S.C. §365(b) from Finnish Patent Application No. 981491, which was filed in Finland on Jun. 29, 1998, and from which priority was properly claimed in the aforementioned international stage application.

BACKGROUND OF THE INVENTION

1. Field of the Invention

The present invention is directed generally to configuring base station in a cellular telecommunication system and specifically to a method for configuring an indoor cellular base station and to a system for implementing this method.

2. Description of the Related Art

In FIG. 1 a known method to install and configure cellular Base Transceiver Stations is shown. Digital maps of the building and a database describing positions of external antennas are first edited in step 1. The indoor network for the building is planned in step 2 using a network planning tool with the data acquired in the previous phase. The base stations that are allocated to the building are installed and configured in step 3 using the planned parameters. When the base stations are activated the performance of the indoor network is measured in step 4. If the performance is found acceptable in step 5, the installing and configuring of the base stations is ended. If any correctable errors are found in step 5, the procedure is repeated from step 2 using the data obtained from the measurements. Additional base stations are installed and/or different configuration parameters experimented with in step 3. The performance of the resulting configuration is measured in step 4 and compared in step 5 to the desired performance. The procedure is repeated from step 2 until an acceptable result is obtained.

One problem in the configuration of base stations according to the prior art is the time required to configure a station for the specific installation area, for example an apartment in a building. The prior art methods used are time consuming, since simulation is typically used for finding correct operation parameters for the base station. Further, extensive measurement campaigns are typically performed for finding the optimum locations for the base stations. As a result, installation time for a base station may be up to 8 days.

BRIEF SUMMARY OF THE INVENTION

An object of the invention is to present a better and easier method for configuring an indoor base station in a building. A further object of the invention is to provide a method, which requires considerably less installation time needed for installation of a single base station.

This is achieved by active use of a mobile communications means as a frequency scanner and using the results of the scanning in the configuration of correct base station parameters.

The invention concerns a method for configuring a base station.

The invention is further directed to a mobile station for configuring a base station of a cellular telecommunications network.

The present invention allows configuring of an indoor base station with less planning than according to prior art methods. Suitable places for the stations are first located by a rough inspection of the building, whereafter the stations are installed and wired by an installation engineer. The base stations are configured using a mobile communication means for both scanning the frequencies and communicating the results of the scanning to the base station. An advantage of the invention is, that the invention allows obtaining free frequencies on-site for the base stations to operate on and after selecting a sufficient amount of frequencies, uploading the selections to the base stations. Theoretical calculations are not necessarily needed for finding frequencies that are free enough from the effect of the external network outside the building. The means used for scanning and selecting the frequencies can be made easy to use. In an advantageous embodiment of the invention, no manual setting of frequencies for the base station is needed because of automated data exchange between the scanning means and the base station. Configuring of a base station with the inventive method and arrangement is much faster compared to prior art methods. Configuration time can be shortened as long as about 8 days according to the prior art methods to as low as 1 hour using the inventive method.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is described in detail in the following by referring to the attached drawings, in which.

DETAILED DESCRIPTION OF THE PRESENTLY PREFERRED EMBODIMENTS

Figure 1:
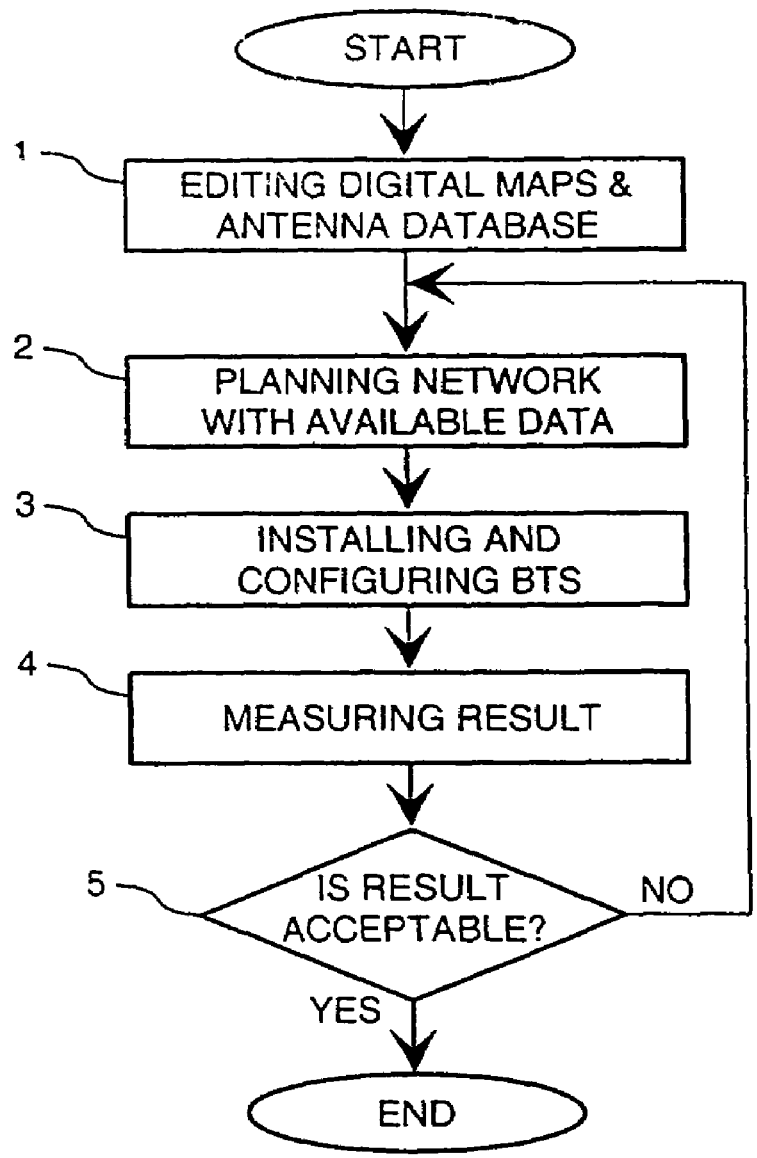
FIG. 1 presents a prior art method to configure a base station.

FIG. 1 was described previously in connection with description of prior art.

Figure 2:
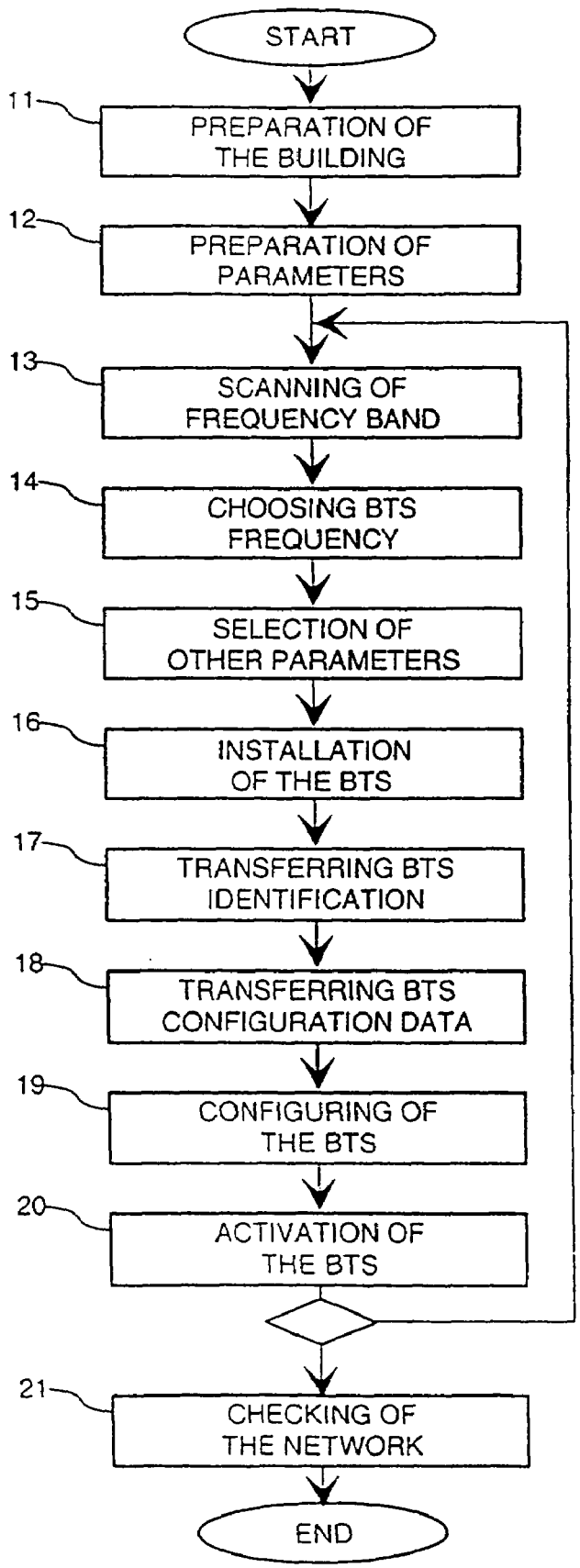
FIG. 2 presents a method according to an advantageous embodiment of the invention in a flow chart.

In one advantageous embodiment of the invention, installation of an indoor cellular network proceeds in the following four phases. This embodiment is illustrated by FIG. 2.

1. Preparation of the Building

In the first phase 11, the building is roughly inspected, if possible. Based on the inspection and maps of the building, preliminary locations for base stations are located. Preferably, a slightly larger number of preliminary locations are preplanned than will actually be used. Some locations are preferably prepared near entrances to the building to form a gateway to surrounding cellular network. Sufficient overlap with the surrounding network is necessary to allow smooth handover of connections from the in-building network to the surrounding network and vice versa. A data transmission network is constructed in the building based on these preplanned preliminary locations. For example, existing telephone wiring can be used for construction of the data transmission network. Any necessary network elements for creating the data transmission network in addition to the wiring are installed at this phase.

2. Preparation of Parameters

At the second phase 12, default parameter sets, cell identifiers, base station identifiers and any other eventual necessary base station setup information are assigned to each location. A frequency band is selected for the indoor cellular system. The frequency band may be, for example, a dedicated office band or the whole band of the particular network operator. All this information is downloaded to a mobile communication means of an installation engineer. Further, information describing the contents of the frequency band, i.e. frequencies used by the neighbouring external cellular system using the same frequency band is downloaded. Particularly, BCCH frequencies of the neighbouring cells are listed, along with corresponding TCH frequencies.

3. Installation of Base Stations

In the third phase, the base stations are installed and configured. At each installation location, an installation engineer scans 13 the chosen frequency band with said mobile communication means. The interference from an external network is typically strongest near windows, doors and other ports in walls. Preferably, the mobile communication means presents a spectrum display of measured signal levels within the frequency band, with BCCH and TCH frequencies of the neighbouring cells of the external network indicated in the same display. This allows the installation engineer to choose 14 an operation frequency for the base station, which frequency is free enough from outside interference. With the aid of the indicated BCCH frequencies and corresponding TCH frequencies of neighbouring cells, the engineer can avoid selecting a frequency, which is used as a TCH channel in a neighbouring cells. During a single measurement session, a neighbouring cell may have set the transmission level of the TCH channel relatively low, which would be seen as a low enough interference level inside of the building. However, since the transmission level of TCH channels is generally adjusted according to quality of radio link to various mobile stations, at some another time the neighbouring cell may use considerably higher transmission power for the TCH channel. Therefore, the signal level of the corresponding BCCH frequency is preferably taken into account. Transmission power of BCCH channels is not varied, whereby observation of the signal level at a BCCH frequency gives the a better worst-case estimate of the level of interference at the TCH frequency of the same cell.

After selecting the frequency, the engineer selects the desired 15 parameter set according to the surroundings of the base station location and sets the power level of the base station. The power level and the parameter set can be changed afterwards if necessary, for example, if during actual use of the station it is found that a slightly different power level and/or parameter set is appropriate. The power level can preferably be selected from a plurality of different preset levels. Next, the engineer preferably installs 16 the base station into the location, connects it to data transmission and power lines, and switches the base station on. After the base station has performed any eventual power-on tests, the engineer inputs 17 the base station identification information to the base station. This may be proceeded using a keypad of the base station, for example, or by transmitting the information by an IR link or a cable from the mobile communication means to the base station. When the base station has received the identification information, it can perform the configuration of the transmission link between the base station and the corresponding base station controller (BSC) of the indoor cellular system.

When the transmission link between the base station and the BSC is ready for use, the rest of the configuration information is input to the base station. Preferably, this is performed by transmitting 18 the configuration information from the mobile communication means of the installation engineer to the BSC, which then configures 19 the base station according to the received configuration information. The transmission of the configuration information to the BSC may be effected, for example, via the base station using an IR link or a cable between the base station and the mobile communication means, or for example, using a data call through the external network between the mobile communication means and the network management system of the indoor cellular system. After the configuration, the indoor cellular network instructs the base station to be activated 20.

In another embodiment of the invention, the configuration data is transmitted to the network management system (NMS) of the indoor cellular system, which then configures the base station. In such an embodiment, the BSC effectively only relays the configuration commands from the NMS to the base station.

Before transmission of the configuration data, the connection should in a preferable embodiment of the invention be authenticated by the indoor cellular network for security reasons.

The procedure of the third phase is repeated for each site. Since in the preplanning phase more sites were prepared than will most probably be needed, the installation engineer may leave some sites uninstalled according to his/her judgment, for example.

Preferably, the installing of the base stations is started from the gateway cells because the number of frequencies that are available decreases each time when a site is set up, whereafter there are fewer frequencies to choose from, and since designing of the necessary overlap between the external and indoor network requires more freedom in the selection of the frequencies than setting up of a single indoor base station.

4. Ensuring the Functioning of the Indoor Network

In the fourth phase 21, after the base stations have been installed, the operation of the indoor network is checked. This can be performed by the installation engineer or engineers by moving in the building while having a connection to the network with the mobile communication means of the engineer. Preferably, the mobile communication means is equipped with means such as a program for monitoring the performance of the network. If locations having poor field strength are observed, more base stations can be installed to cover such coverage holes. Also, the operating parameters of the base stations may be adjusted at this phase.

Figure 3:
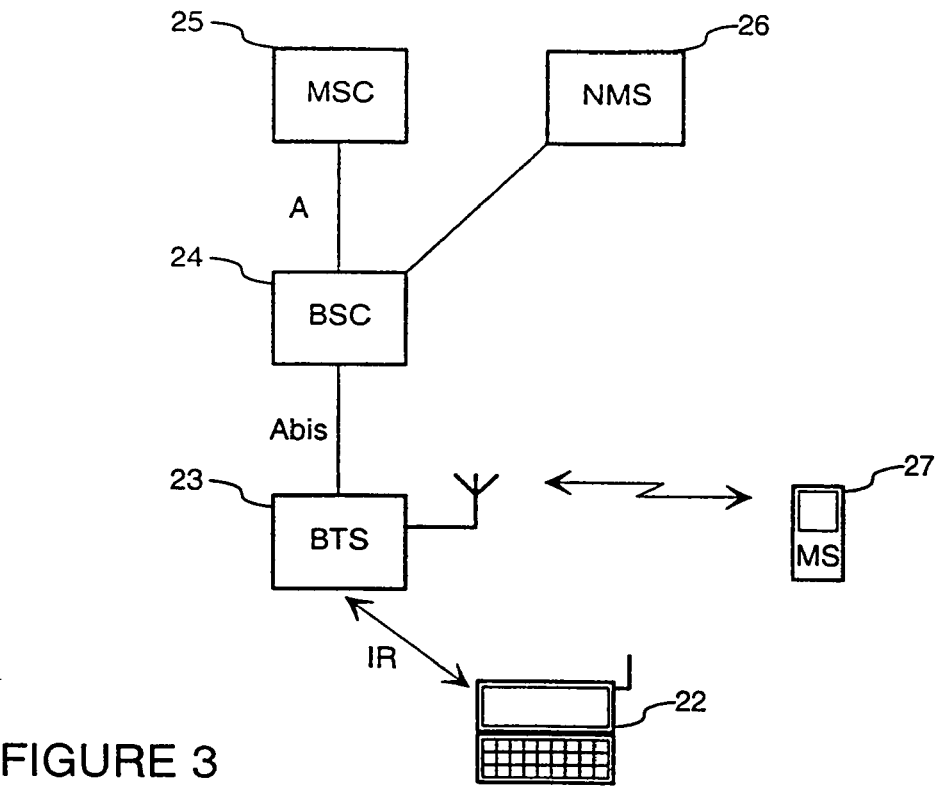
FIG. 3 presents a block diagram of an advantageous embodiment of the invention.

FIG. 3 illustrates an arrangement according to an advantageous embodiment of the invention. Mobile communications means 22 is used for the configuration of the Base Transceiver Station BTS 23 via an IR or a serial interface. BTS 23 is connected to a base station controller BSC 24 through an Abis interface. BSC 24 is used to set the parameters of the base station 23. BSC 24 is further connected to an Mobile Switching Centre MSC 25 through an A interface. The MSC 25 performs switching functions and other duties. BSC 24 is also connected to a Network Management Station NMS 26 which is a part of the network supervision system. NMS 26 is used to control the network elements of the network. The mobile station MS 27 can be used for normal calls after the configuration of the base station 23.

The mobile communications means 22 is preferably a mobile phone with speech and data capabilities and a special program for controlling the scanning and input of the configuration information. The program obtains data from the NMS 26, controls measuring of the reception levels at the frequencies of the chosen frequency band, manages configuration parameters such as the power levels and other necessary parameters and controls sending of configuration data to the BTS 23. Preferably the application for measuring reception levels calculates averaged reception levels for the frequencies. The reception levels are preferably space averaged, which can be done for example by moving the mobile communication means around within the area of the base station site and averaging the measurement results obtained during the movement.

The BTS 23 can include control lights for indicating the status of the equipment. Different status indications can be for example the following: "just powered-on", "transmission line ready", "on-line but barred and no handovers", "on-line but barred" and "fully on-line".

Figure 4:
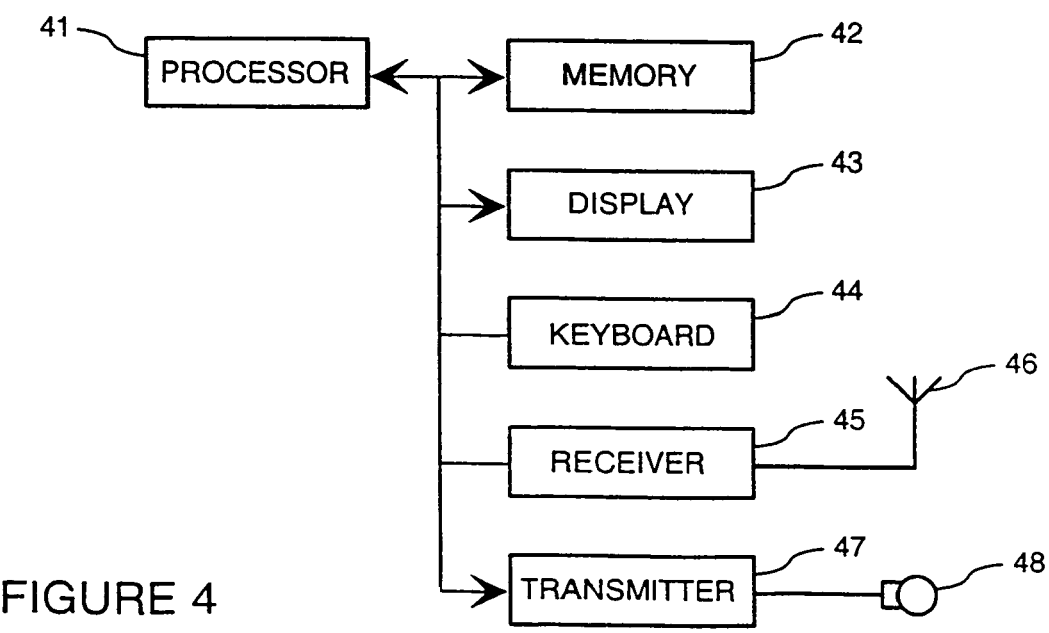
FIG. 4 presents a block diagram of a mobile station according to one advantageous embodiment of the invention.

FIG. 4 shows a block diagram of a mobile station for configuring a base station according to an advantageous embodiment of the invention. A processor 41 is used for controlling frequency scanning, a memory 42 for storing a program for the processor 41, a receiver 45 and an antenna 46 for receiving on a plurality of frequencies, and transmitting means 47 for transmitting data based on frequency scanning to a base station. The mobile station also includes a display 43 for presenting menus and results of the frequency scanning and a keyboard 44 for inputting data as a frequency selection for the BTS. The transmitting means include an IR transmitter 47 and an IR light emitting diode 48 for transmitting data to the BTS.

In other embodiments of the invention, other transmission means such as a serial RS-232 line can be used to transmit the configuration information. However, the invention is not limited to these ways of transmitting the configuration information, since any other way of transmitting the configuration information may be used. For example, if the mobile communication means which is used for scanning is a dual band device capable of operating in two different frequency bands, such as the 900 MHz GSM band and the 1800 MHz GSM band, the mobile communication means can scan the frequencies of a first of these two bands and transmit the configuration information on the second of these two bands to for example another mobile communication means connected to the BSC 24. In an another advantageous embodiment of the invention, the mobile communication means is used first to scan and store information, and after the scanning, to send the configuration data using the same frequency band via the outside cellular network to the BSC.

In a preferable embodiment of the invention, a multifunction mobile communication means is used for scanning the frequencies. A multifunction mobile communication means typically comprises elements needed for a cellular phone and a data processing part having a display and a keyboard for processing data transmitted using the cellular phone part. Such a multifunction mobile communication means is presented, for example, in the magazine Mobile Communications International, Issue no. 31, May 1996, on pages 57 and 58. According to an advantageous embodiment of the invention, such a multifunction mobile communication means is equipped with a program for controlling the scanning and performing other necessary tasks for base station configuration as described previously. The following example is presented to explain an advantageous embodiment of the invention. We assume that an office building of three floors is in an area having an external cellular network, and indoor base stations are to be installed in the building. First the building is visited to find out approximate number of the base stations needed and the locations for the base stations. The entrance corridor of the building must have some gateway cells and all rooms separated with solid walls must have at least one cell. The most probable places of interference from the external network in each cell are measured using mobile communications means for frequency scanning to find free frequencies in all places where the mobile phones will be operated in the area of the cell. Subsequently, one of the free frequencies and a power level is selected for the base station of each cell. The base station is installed with preset parameters, and selected configuration data is transmitted to the base station. The station is then activated and the procedure is repeated for the next base station and cell. The stations are preferably configured in order so that the gateway cells are configured first, then the other cells on the ground floor second and the cells in the other floors last.

After the actual installation the network is preferably optimized so that the at least the following key aspects are in condition. The indoor network should not unnecessarily disturb the surrounding outdoor network, which can be avoided by using a sufficient number of indoor base stations with low power levels. However, the number of base stations should not be too high to avoid unnecessary costs. The number of sites can be optimized with intelligent trimming of base station parameters such as the power levels. If the configuration of the outdoor network is changed at a later time, the indoor network has to be checked to avoid conflicting frequencies after the change.

In one advantageous embodiment of the invention, the near neighbour relations of the indoor network are specified preliminarily during the BTS site location phase, and the near neighbour relations are adjusted as base stations are installed. If some base station locations are left installed, corresponding entries in the near neigbour list are removed.

In another advantageous embodiment of the invention, the near neighbour lists are created during the BTS installation phase. For example, the installation engineer can enter each newly installed BTS to the near neighbour list and define the near neighbour relations of the BTS after installation of the BTS by using the mobile communication means of the engineer.

The parameter sets described previously preferably correspond to different surroundings of a base station. For example, one parameter set may be intended for base stations at open offices and other open spaces and a second for locations surrounded by separate rooms. During the preplanning phase, one or more such parameter sets may be defined. Preferably, a parameter set identification is associated with each parameter sets, whereby at BTS installation the engineer only needs to select the desired identification without having to enter all of the various parameters.

Although the invention has been described previously using examples and terminology pertaining to a GSM network, the invention is not limited to any way to the GSM network only. The inventive installation method may for example be used with the UMTS system as well. Further, although the invention has been described using an indoor cellular system as an example, the inventive method may advantageously be used also in other types of surroundings. The inventive method is especially advantageous when installing micro- and picocells, i.e. cells with a relatively small size, where simulation methods do not provide as reliable preplanning information as in the case of large macrocells.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for configuring a base station of a cellular network comprising the steps of:
   downloading information about frequencies used by neighboring base stations into a mobile communication means,
   scanning a frequency band of the cellular network with said mobile communication means for determining signal levels within the frequency band, wherein said step of scanning comprises the sub-steps of:
      measuring reception levels at frequencies within the frequency band; and
      space averaging the measured reception levels;
   receiving a selection of an operating frequency for the base station from the user of said mobile communication means,
   transmitting configuration information comprising at least the selected operating frequency for the base station from said mobile communication means, and
   configuring the base station according to the transmitted information.

2. The method according to claim 1, further comprising the steps of:
   downloading at least one parameter set into said mobile communication means from the network, and
   selecting one parameter set from said at least one parameter sets for the base station using said mobile communication means,
   wherein the step of transmitting configuration information comprises the sub-step of:
      transmitting information about the selection of the parameter set to the cellular network.

3. The method according to claim 1, further comprising the step of:
   selecting the transmission power of the base station using said mobile communication means.

4. The method according to claim 1, further comprising the step of:
   creating the near neighbor relations of the base station.

5. The method according to claim 1, further comprising the step of:
   adjusting the near neighbor relations of the base station.

6. The method according to claim 1, wherein said information about frequencies comprises information of BCCH frequencies of nearby cells and of TCH frequencies corresponding to said BCCH frequencies.

7. The method according to claim 1, wherein the sub-steps of measuring and space averaging comprise the steps of:
   measuring reception levels while moving the mobile communication means in the area of the base station; and
   averaging the results obtained during the movement of the mobile communication means.

8. A mobile station for configuring a base station of a cellular telecommunications network, comprising:
   a processor for controlling frequency scanning,
   a memory for storing a program for the processor,
   a receiver and an antenna for receiving on a plurality of frequencies,
   transmitting means for transmitting data obtained from frequency scanning to a base station,
   processing means to receive measurements of reception levels at frequencies within a frequency band of the cellular telecommunications network, wherein said measurements are space averaged to determine an average reception level for a frequency, and
   processing means to transmit configuration information for the base station to the cellular telecommunications network.

9. The mobile station according to claim 8, further comprising:
   a display for presenting results of said frequency scanning, and
   a keyboard for inputting data.

10. The mobile station according to claim 8, wherein the mobile station is moved around the base station while the reception levels are being measured and the measurements obtained during the movement are averaged to determine said average reception level.

11. A method for installing, configuring, and/or reconfiguring a base station at a location of a cellular network using a mobile station, comprising the steps of:
   downloading base station setup information about the location of the base station into the mobile station, wherein said base station setup information comprises a frequency band selected for the location;
   selecting, by a user using the mobile station, an operation frequency for the base station, by performing the sub-steps of:
      moving the mobile station around in order to take a plurality of measurements of reception levels at different spots within the transmission area of the base station,
      averaging together the measured reception levels to obtain an average reception level for each frequency in the selected frequency band, and
      selecting, based at least on the averaged reception levels, an operation frequency for the base station from the frequencies with the selected frequency bands; and
   transmitting the selected operation frequency to the base station, whereby the operation frequency of the base station is configured.

12. The method of claim 11, wherein the step of transmitting the selected operation frequency comprises the step of:

transmitting, from the mobile station to a network element in the cellular network, the selected operation frequency, wherein the cellular network transmits the selected operation frequency to the base station.

13. The method of claim 11, wherein the step of transmitting the selected operation frequency comprises the step of:

transmitting, from the mobile station directly to the base station, the selected operation frequency.

14. The method of claim 11, wherein the base station setup information further comprises at least two parameter sets, and the method further comprises the steps of:

selecting a parameter set from the at least two parameter sets based on surroundings of the base station;

transmitting the selected parameter set to the base station.

15. The method of claim 11, wherein the base station setup information further comprises at least one base station identifier, and the method further comprises the step of:

inputting a base station identifier of the at least one base station identifier into the base station.

16. The method of claim 11, wherein the base station setup information further comprises one or more frequencies within the selected frequency band which are used by nearby cells in the cellular system, and the step of selecting the operation frequency further comprises the sub-step of:

displaying, on a display of the mobile station, the spectrum of averaged reception levels of the frequencies within the selected frequency band, wherein the average reception levels of the one or more frequencies within the selected frequency band which are used by nearby cells in the cellular system are also shown in the displayed spectrum.

* * * * *